United States Patent
Shibasaki

(10) Patent No.: US 8,494,103 B2
(45) Date of Patent: Jul. 23, 2013

(54) RECEPTION CIRCUIT

(75) Inventor: Takayuki Shibasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 58 days.

(21) Appl. No.: 13/310,773

(22) Filed: Dec. 4, 2011

(65) Prior Publication Data

US 2012/0140811 A1    Jun. 7, 2012

(30) Foreign Application Priority Data

Dec. 6, 2010  (JP) ................................ 2010-271775

(51) Int. Cl.
*H04L 7/00*   (2006.01)
(52) U.S. Cl.
USPC ............................ 375/355; 375/232; 375/371
(58) Field of Classification Search
USPC ................. 375/229, 230, 232, 233, 340, 355, 375/371, 375, 376
See application file for complete search history.

(56) References Cited

U.S. PATENT DOCUMENTS

| | | | |
|---|---|---|---|
| 6,201,832 B1 * | 3/2001 | Choi | 375/233 |
| 7,515,369 B2 * | 4/2009 | Sugawara et al. | 360/51 |
| 8,027,423 B2 * | 9/2011 | Higashino | 375/376 |

OTHER PUBLICATIONS

Gardner, Floyd M. et al., "Interpolation in Digital Modems—Part I: Fundamentals", Mar. 1, 1993, pp. 501-507.
Spurbeck, Mark et al., "Interpolated Timing Recovery for Hard Disk Drive Read Channels", Jan. 1, 1997, pp. 1618-1624.

* cited by examiner

*Primary Examiner* — Dac Ha
(74) *Attorney, Agent, or Firm* — Fujitsu Patent Center

(57) ABSTRACT

A reception circuit includes: a sampling circuit to sample an input data signal based on a clock signal and output a sampled signal; a data interpolation circuit to interpolate the sampled signal based on phase information corresponding to the sampled signal and output an interpolated data signal; an interpolation error decision circuit to output an interpolation error based on the sampled signal and the phase information; a decision/equalization circuit to equalize the interpolated data signal using an equalization coefficient set based on the interpolation error, to check an equalized interpolated data signal and to output a checked signal; and a phase detection circuit to generate the phase information based on at least one of the checked signal and the equalized interpolated data signal and output the phase information to the data interpolation circuit and the interpolation error decision circuit.

10 Claims, 18 Drawing Sheets

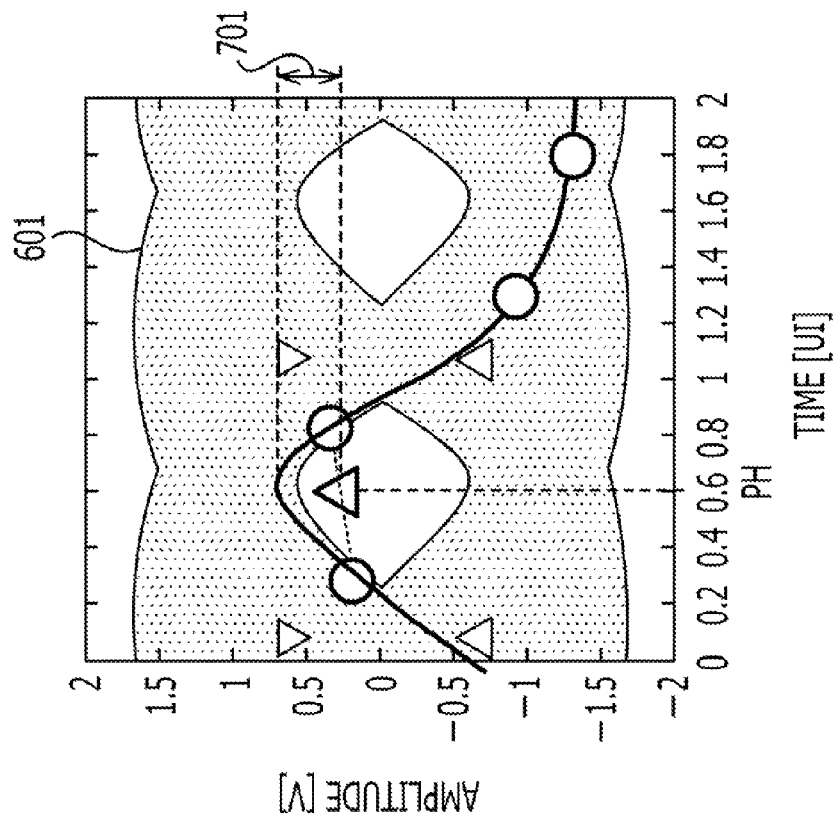
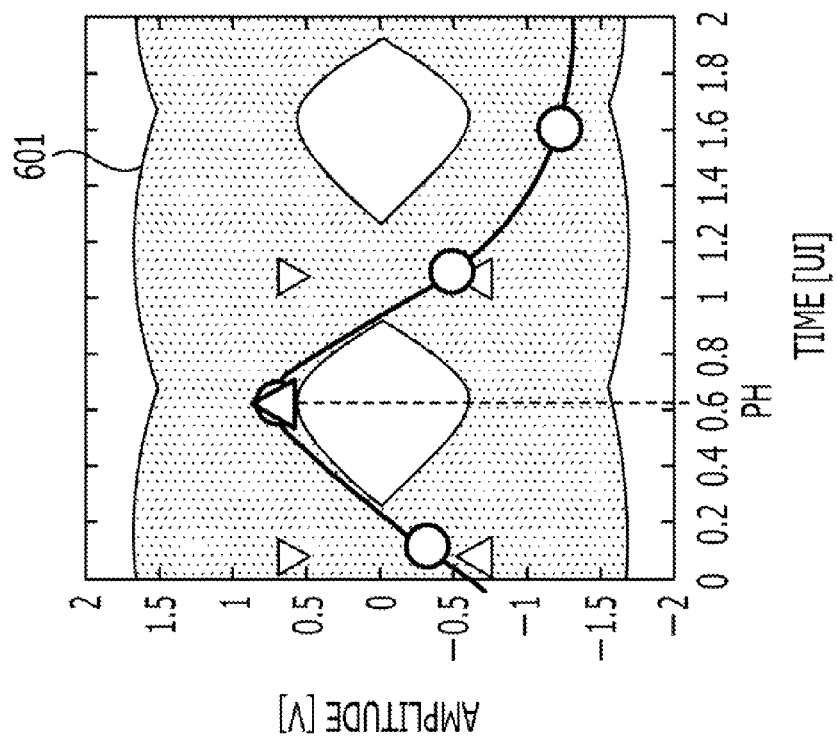

US 8,494,103 B2

RECEPTION CIRCUIT

CROSS-REFERENCE TO RELATED APPLICATIONS

This application claims the benefit of priority from Japanese Patent Application No. 2010-271775 filed on Dec. 6, 2010, the entire contents of which are incorporated herein by reference.

BACKGROUND

1. Field

The embodiments discussed herein are related to a reception circuit.

2. Description of Related Art

In a hard disk drive read channel, an asynchronously sampled signal is interpolated in accordance with a phase error.

Asynchronously sampled data signal are interpolated to adjust the timing for a digital modem.

Related art is described in M. Spurbeck and R. Behrens, "Interpolated timing recovery for hard disk drive read channels," in Proc. IEEE Int. Conf. Communications, June 1997, vol. 3, pp. 1618-1624, F. Gardner, "Interpolation in digital modems—Part I: Fundamentals," IEEE Trans. Commun., March 1993, vol. 41, no. 3, pp. 501-507, etc.

SUMMARY

According to one aspect of the embodiments, a reception circuit includes: a sampling circuit to sample an input data signal based on a clock signal and output a sampled signal; a data interpolation circuit to interpolate the sampled signal based on phase information corresponding to the sampled signal and output an interpolated data signal; an interpolation error decision circuit to output an interpolation error based on the sampled signal and the phase information; a decision/equalization circuit to equalize the interpolated data signal using an equalization coefficient set based on the interpolation error, to check an equalized interpolated data signal and to output a checked signal; and a phase detection circuit to generate the phase information based on at least one of the checked signal and the equalized interpolated data signal and output the phase information to the data interpolation circuit and the interpolation error decision circuit.

It is to be understood that both the foregoing general description and the following detailed description are exemplary and explanatory and are not restrictive of the invention, as claimed.

BRIEF DESCRIPTION OF THE DRAWINGS

FIGS. 5A and 5B illustrate an exemplary relationship between phase information and an interpolation error.

DESCRIPTION OF EMBODIMENTS

Figure 1:
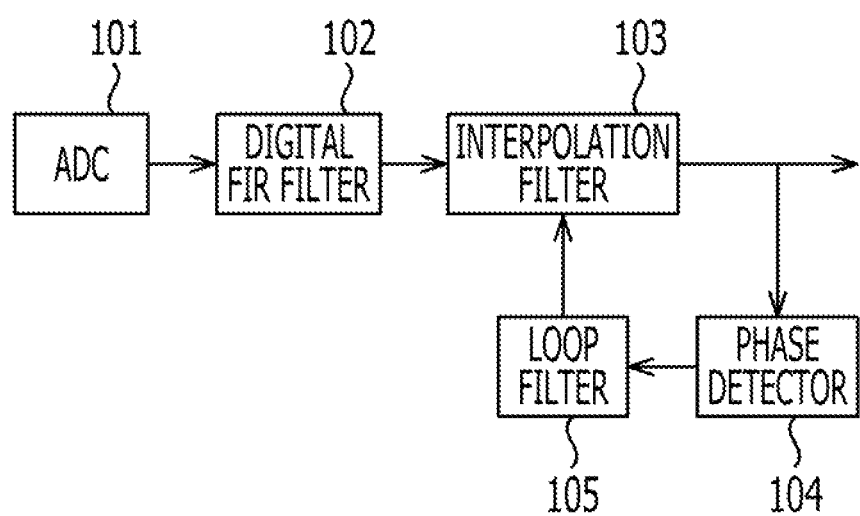
FIG. 1 illustrates an exemplary interpolation circuit.

FIG. 1 illustrates an exemplary interpolation circuit. The interpolation circuit illustrated in FIG. 1 interpolates an asynchronously sampled signal. An analog/digital converter 101 asynchronously samples an analog signal to output a digital signal. A digital FIR filter 102 may include an equalization circuit that equalizes the digital signal. An interpolation filter 103 receives a signal output from the digital FIR filter 102 as an input to interpolate sample values of certain phases in accordance with a phase error output from a loop filter 105. A phase detector 104 detects a phase error based on a signal output from the interpolation filter 103. The detected phase error is output to the interpolation filter 103 via the loop filter 105. The interpolation circuit may not improve due to an interpolation error of the interpolation filter 103.

Figure 2:
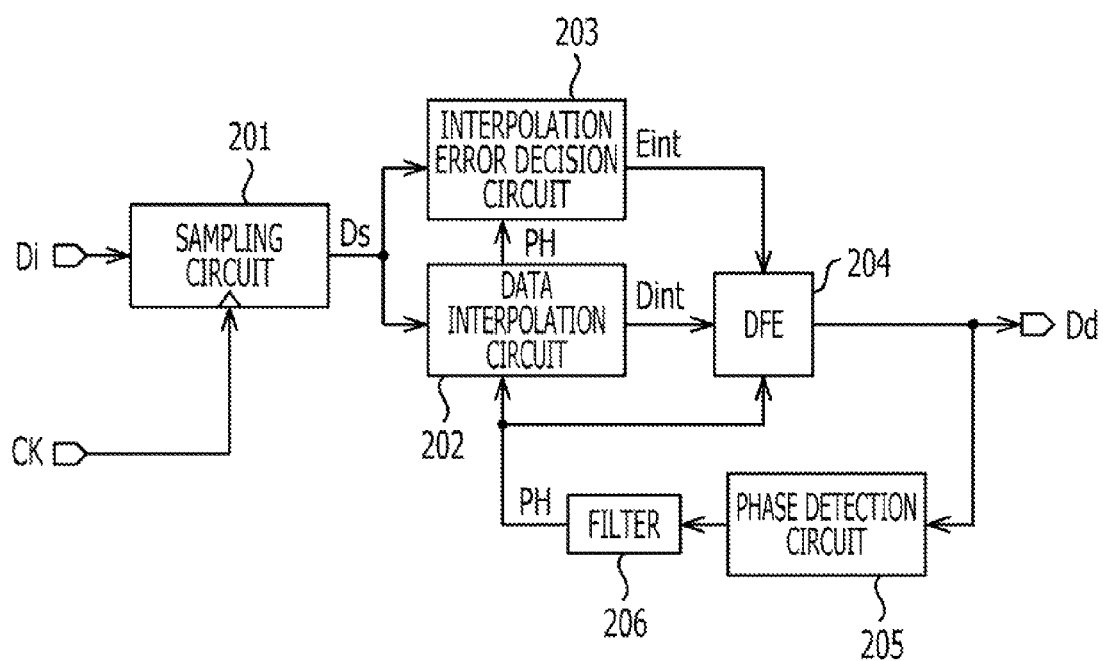
FIG. 2 illustrates an exemplary reception circuit.

FIG. 2 illustrates an exemplary reception circuit. The reception circuit includes a sampling circuit 201, a data interpolation circuit 202, an interpolation error decision circuit 203, a decision/equalization circuit 204, a phase detection circuit 205, and a filter 206. The reception circuit may include a high-speed input/output circuit, for example a blind-type data reception circuit, that transmits and receives a high-bitrate signal within an apparatus, for example within an integrated circuit chip, or between apparatuses, for example between chips. An increase in data rate may increase a signal loss in a transmission line to degrade the reception sensitivity. The reception circuit may compensate for degraded data, make a decision at an appropriate timing, and recover the data.

Figure 3:
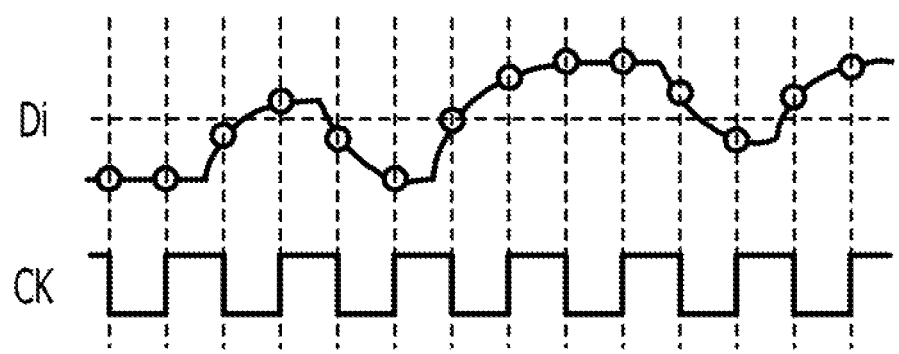
FIG. 3 illustrates an exemplary sampled signal.

The sampling circuit 201 samples an input data signal Di based on a clock signal CK to output a sampled signal Ds. FIG. 3 illustrates an exemplary sampled signal. The sampling circuit 201 samples the input data signal Di in synchronization with a rising edge and a falling edge of the clock signal CK to output a sampled signal Ds indicated by "○" marks illustrated in FIG. 3. Edges of the input data signal Di may be dulled by a signal loss in a transmission line for a binary pulse signal transmitted from a transmission circuit. The transmission circuit generates the input data signal Di based on a clock signal that is asynchronous to the clock signal CK for the reception circuit. Therefore, the input data signal Di and the clock signal CK may be asynchronous to each other, and may have substantially the same frequency. The sampling circuit 201 may include an analog/digital converter that converts an analog input data signal Di into a digital sampled signal Ds in synchronization with the clock signal CK, for example. The sampled signal Ds may be a 6-bit signal, for example.

The data interpolation circuit 202 interpolates the sampled signal Ds based on phase information (phase code) PH to output an interpolated data signal Dint. The phase information PH may include information on the phase of the sampled signal Ds with respect to the input data signal Di.

Figure 4A:
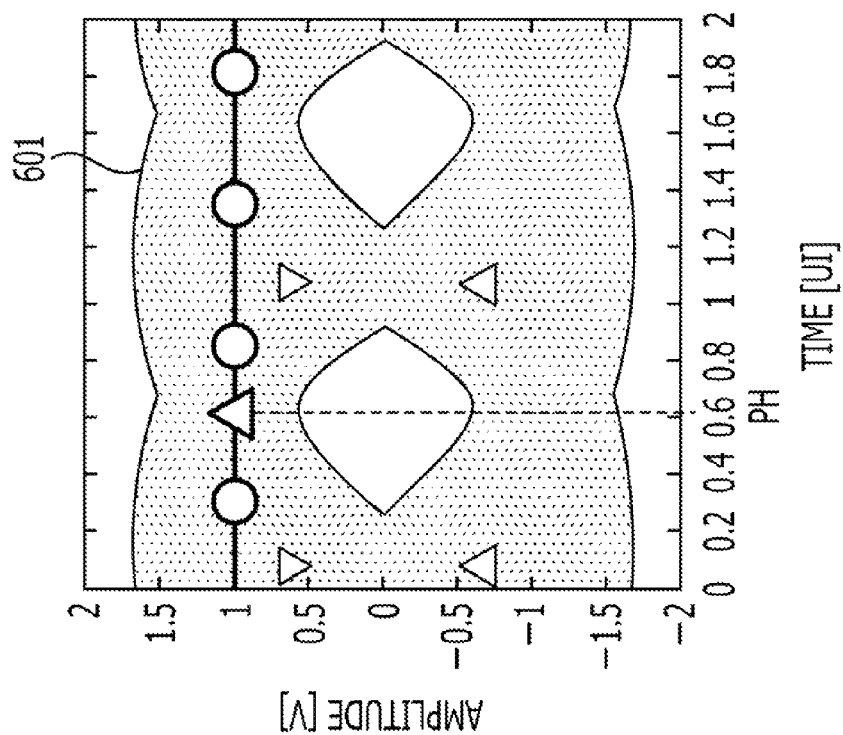
FIGS. 4A and 4B illustrate an exemplary relationship between phase information and an interpolation error.

FIGS. 4A, 4B, 5A, and 5B each illustrate an exemplary relationship between phase information and an interpolation error. In FIGS. 4A and 5A, the horizontal axis indicates the time, and the vertical axis indicates the amplitude [V]. A region 601 indicates a region in which the input data signal Di is overwritten each period of two unit intervals (UIs). The input data signal Di transitions through a path with a certain width under the influence of a transmission line etc. The input data signal Di may transition within the region 601. The "○" marks indicate the sampled signal Ds. For example, a high level may be indicated by +1 [V], and a low level may be indicated by −1 [V]. In the sampled signal Ds indicated by the "○" marks illustrated in FIG. 4A, the input data signal Di may be at a high level, and no data transition may occur in the input data signal Di. In the sampled signal Ds indicated by the "○" marks illustrated in FIG. 5A, data transition occurs in the input data signal Di. The times, for example phases, of the sampled signal Ds indicated by first and third "○" marks may be the phases of boundaries of the input data signal Di where the input data signal Di transitions (varies). The times (phases) of the sampled signal Ds indicated by second and fourth "○" marks may be the phases of the middle points between the boundaries of the input data signal Di. The period between the boundary of a sampled signal Ds, for example the phase of the sampled signal Ds indicated by the first "○" mark, and the boundary of the next sampled signal Ds, for example the phase of the sampled signal Ds indicated by the third "○" mark, may be one unit interval (1 UI). The time indicated by the horizontal axis of FIG. 4A may be represented in units of [UI]. In FIG. 4A, four "○" marks for the sampled signal Ds are illustrated in 2 UIs. The reception circuit recovers data Dd for each UI based on the input data signal Di. For example, since, as illustrated in FIG. 5A, the sampled signal Ds indicated by the first and third "○" marks indicates transitioning boundary data, a reliability for a value may be small. Since, as illustrated in FIG. 5A, the sampled signal Ds indicated by the second and fourth "○" marks indicates stable middle data, a reliability for a value may be large. The reception circuit outputs data at the middle of each UI as recovered data Dd. The reception circuit detects the phase information PH for the data at the middle of each UI. For example, the sampled signal Ds indicated by the first and third "○" marks may be sampled in synchronization with a rise of the clock signal CK. The sampled signal Ds indicated by the second and fourth "○" marks may be sampled in synchronization with a fall of the clock signal CK. The phase information PH may indicate the phase at the middle of the data, for example, the phase of the sampled signal Ds indicated by the second "○" mark, with reference to the phase of a rising edge of the clock signal CK, for example the phase of the sampled signal Ds indicated by the first "○" mark, and may be in the range of 0 [UI] or more and less than 1 [UI]. The phase information PH illustrated in FIG. 4A may be 0.5 [UI].

The data interpolation circuit 202 receives the sampled signal Ds and generates an interpolated data signal Dint indicated by a "Δ" mark at the phase corresponding to the phase information PH through linear interpolation using linear interpolation. Since, in FIGS. 4A and 5A, the phase information PH includes the sampled signal Ds indicated by the second "○" mark, the sampled signal Ds indicated by the "○" mark and the interpolated data signal Dint indicated by the "Δ" mark may be substantially the same as each other. The data interpolation circuit 202 may generate the interpolated data signal Dint using interpolation other than linear interpolation.

Figure 6:
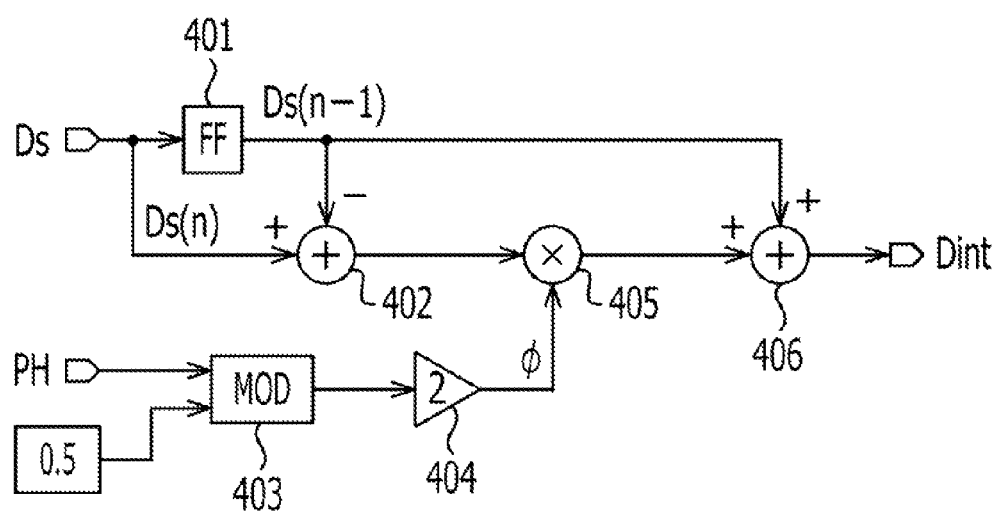
FIG. 6 illustrates an exemplary data interpolation circuit.
Figure 7:
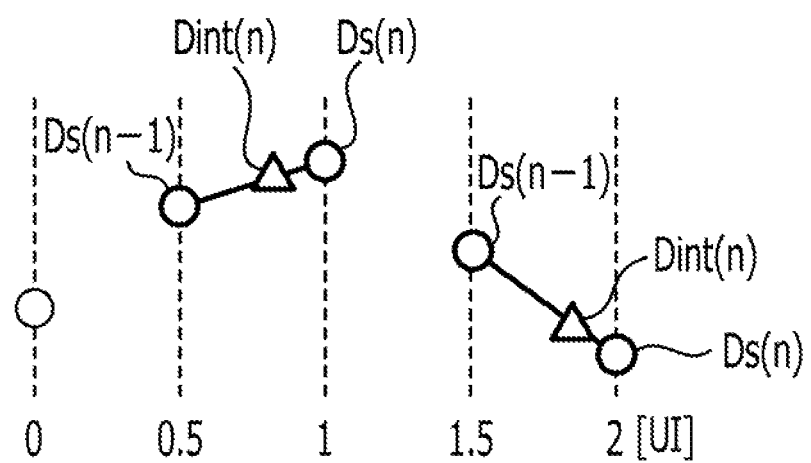
FIG. 7 illustrates an exemplary linear interpolation method.

FIG. 6 illustrates an exemplary data interpolation circuit. FIG. 7 illustrates an exemplary linear interpolation method. The linear interpolation method illustrated in FIG. 7 may be performed by the data interpolation circuit 202 illustrated in FIG. 6. A remainder calculator 403 outputs the remainder of PH÷0.5. A multiplier 404 doubles a signal output from the remainder calculator 403 to output phase information. A flip-flop 401 delays an n-th sampled signal Ds(n) by one sample to output an n−1-th sampled signal Ds(n−1). A subtractor 402 subtracts the sampled signal Ds(n−1) from the sampled signal Ds(n). A multiplier 405 multiplies an output of the subtractor 402 and the phase information. An adder 406 adds a value output from the multiplier 405 and the sampled signal Ds(n−1) to output an n-th interpolated data signal Dint(n).

The data interpolation circuit 202 generates the n-th interpolated data signal Dint(n) at the phase corresponding to the phase information PH based on the n−1-th sampled signal Ds(n−1), the n-th sampled signal Ds(n), and the phase information using linear interpolation represented by the following formula:

$$D\text{int}(n) = \{Ds(n) - Ds(n-1)\} \times x + Ds(n-1)$$

For example, the phase at 0, 1, and 2 [UI] illustrated in FIG. 7 may be the timing of a rising edge of the clock signal CK. The interpolated data signal Dint(n) between 0.5 and 1 [UI] may be an interpolated data signal with the phase information PH at 0.8 [UI]. The interpolated data signal Dint(n) between 1.5 and 2 [UI] may be an interpolated data signal corresponding to the phase information PH at 1.8 [UI]. The data interpolation circuit 202 generates the interpolated data signal Dint positioned substantially at the middle between the boundaries of the input data signal Di based on the phase information PH.

Figure 4B:
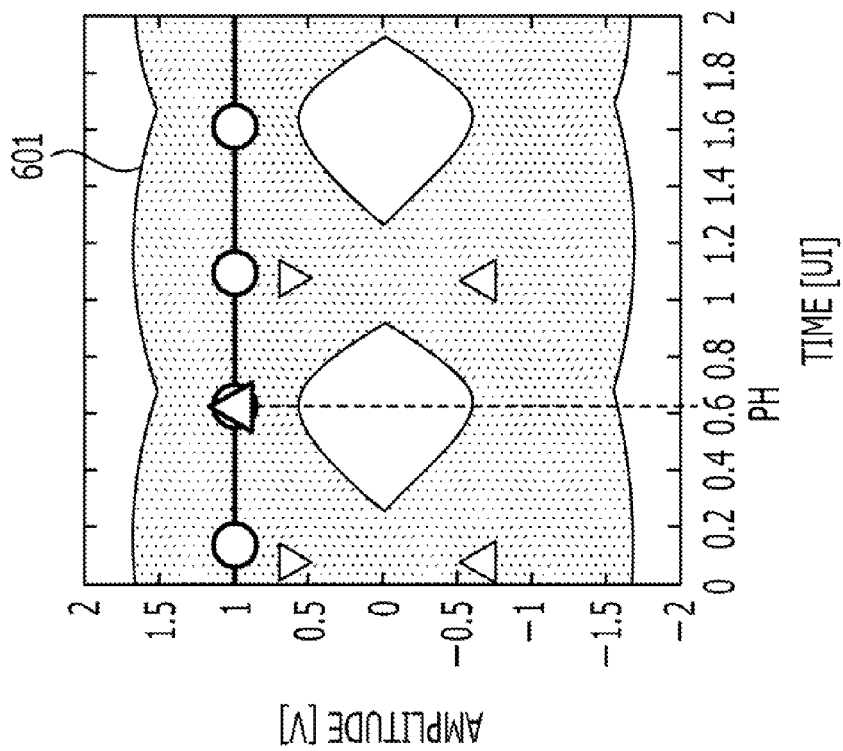

The input data signal Di and the clock signal CK may be asynchronous to each other. The phase of an edge, for example a rising edge, of the clock signal CK and the phase at the middle of the data may be different from each other. In FIGS. 4B and 5B, the phase of a falling edge of the clock signal CK and the phase at the middle of the data may be different from each other. In FIG. 4B, no data transition may occur. In FIG. 5B, data transition may occur. The data interpolation circuit 202 performs linear interpolation on the sampled signal Ds indicated by the first "○" mark and the sampled signal Ds indicated by the second "○" mark to generate the interpolated data signal Dint indicated by the "Δ" mark at the phase corresponding to the phase information PH. Since no data transition occurs in FIG. 4B, no interpolation error may be caused. Since data transition occurs in FIG. 5B, an interpolation error 701 may occur.

In FIGS. 4A and 4B, when no data transition occurs, no interpolation error may occur. In FIGS. 5A and 5B, when data transition occurs, the interpolation error 701 may become large based on the relationship between the phase of the sampled signal Ds and the phase of the phase information PH. When the interpolation error 701 is corrected in FIG. 5B, degradation of the reception circuit may be reduced. In FIG. 5B, the absolute value of the sampled signal Ds may be a certain value or less, and the data may transition as illustrated in FIGS. 5A and 5B, for example. In FIG. 5B, the value of the phase information PH may be within a certain range, and the difference between the phase of an edge of the clock signal CK and the phase of the phase information PH may be large as illustrated in FIG. 5B, for example. When the absolute value of the sampled signal Ds is the certain value or less and the value of the phase information PH is within the certain range, for example, when data transition occurs and the difference between the phase of an edge of the clock signal CK and the phase of the phase information PH is large, the interpolation error 701 becomes large and therefore the decision/equalization circuit 204 may correct the interpolation error 701.

The interpolation error decision circuit 203 checks whether or not the absolute value of the sampled signal Ds is the certain value or less and checks whether or not the value of the phase information PH is within the certain range, and outputs an interpolation error Eint. The interpolation error Eint may take two, three, or more values. For example, the interpolation error Eint may be 1 when the interpolation error is a threshold value or more, and may be 0 when the interpolation error is less than the threshold value.

In FIG. 5A, the difference between the phase of the interpolated data signal ("Δ" mark) Dint and the phase of the sampled signal ("○" mark) Ds may be 0. The phase of the interpolated data signal ("Δ" mark) Dint may be the phase corresponding to the phase information PH. The phase information PH may be 0 or 0.5 [UI], and no interpolation error may be provided. When the difference between the phase of the phase information PH and the phase of the sampled signal ("○" mark) Ds is small, the interpolation error may be small. When the interpolation error is less than the threshold value, the interpolation error decision circuit 203 may output an interpolation error Eint of 0.

In FIG. 5B, the difference between the phase of the interpolated data signal ("Δ" mark) Dint and the phase of the sampled signal ("○" mark) Ds may be large. The phase of the interpolated data signal ("Δ" mark) Dint may be the phase of the phase information PH. The phase information PH may be 0.25 or 0.75 [UI], and the interpolation error 701 may be large. When the difference between the phase of the phase information PH and the phase of the sampled signal ("○" mark) Ds is large, the interpolation error 701 may be large. When the interpolation error is more than the threshold value, the interpolation error decision circuit 203 may output an interpolation error Eint of 1.

Figure 8:
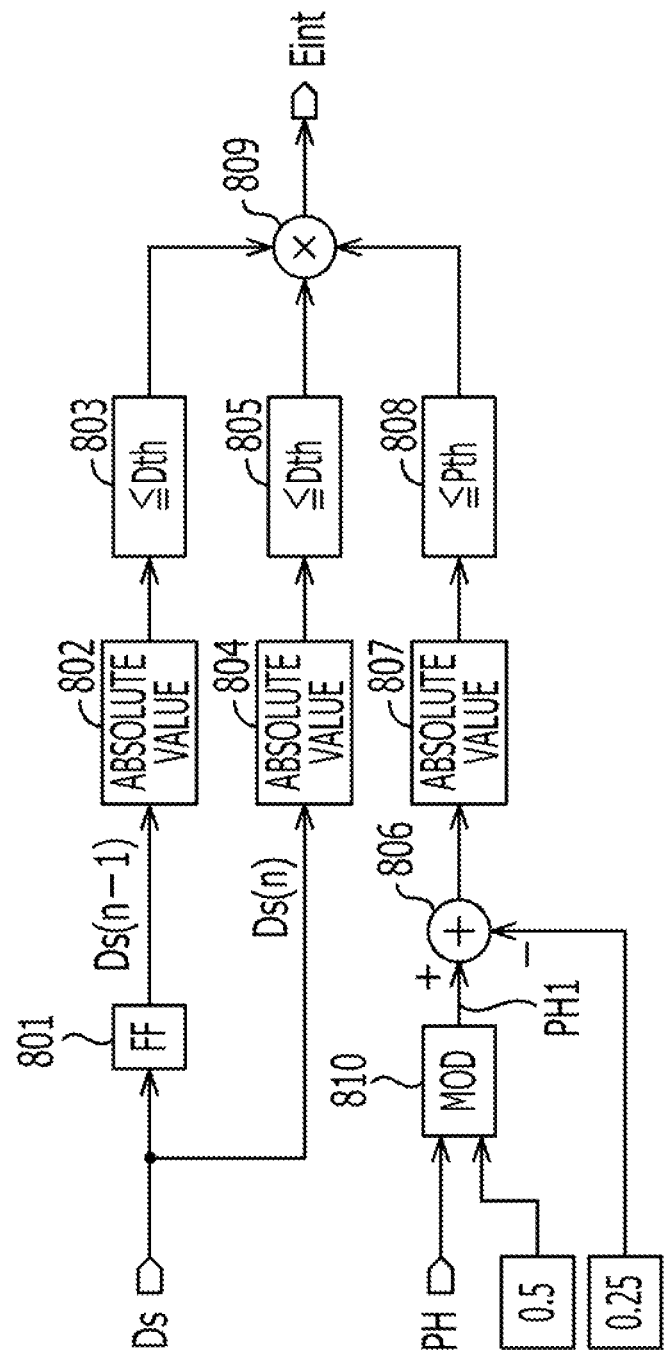
FIG. 8 illustrates an exemplary interpolation error decision circuit.

FIG. 8 illustrates an exemplary interpolation error decision circuit. The interpolation error decision circuit 203 detects an interpolation error based on whether or not the absolute value of the sampled signal Ds is a certain value or less and the phase information PH is within a certain range. The interpolation error decision circuit 203 generates the interpolation error Eint based on transition information and the phase information PH of the sampled signal Ds. When a reference value (threshold value) of the sampled signal Ds is Dth and a threshold value of the phase information PH is Pth, the interpolation error decision circuit 203 may generate the interpolation error Eint using the following logical formula. In the formula, & indicates a logical product, and PH1 indicates the remainder of PH÷0.5.

$Eint = (|Ds(n)|Dth) \& (|Ds(n-1)| \leq Dth) \& (|PH1 - 0.25| \leq Pth)$

A flip-flop 801 delays the sampled signal Ds(n) by one sample to output the sampled signal Ds(n−1). An absolute value circuit 802 outputs the absolute value |Ds(n−1)| of the sampled signal Ds(n−1). A first comparator circuit 803 compares the absolute value |Ds(n−1)| with the reference value Dth, outputs 1 when the absolute value |Ds(n−1)| is the reference value Dth or less and outputs 0 when the absolute value |Ds(n−1)| is more than the reference value Dth.

An absolute value circuit 804 outputs the absolute value |Ds(n)| of the sampled signal Ds(n). A first comparator circuit 805 compares the absolute value |Ds(n)| with the reference value Dth, outputs 1 when the absolute value |Ds(n)| is the reference value Dth or less and outputs 0 when the absolute value |Ds(n)| is more than the reference value Dth.

A remainder calculator 810 outputs the remainder of PH÷0.5 as the phase information PH1. A subtractor 806 subtracts 0.25 from the phase information PH1 to output a value PH1−0.25. An absolute value circuit 807 outputs the absolute value |PH1−0.25| of the value PH1−0.25. A second comparator circuit 808 compares the absolute value |PH1−0.25| with the threshold value Pth, outputs 1 when the absolute value |PH1−0.25| is the threshold value Pth or less and outputs 0 when the absolute value |PH1−0.25| is more than the threshold value Pth. For example, the second comparator circuit 808 may output 0 in case of FIG. 5A, and may output 1 in case of FIG. 5B.

A multiplier (generation circuit) 809 may include a logical product (AND) circuit, and generates as the interpolation error Eint a signal indicating the logical product of the values output from the comparator circuits 803, 805, and 808.

When the absolute value of the sampled signal Ds is the certain value or less, the comparator circuits 803 and 805 may output 1. When the value of the phase information PH is within the certain range, the comparator circuit 808 may output 1. When the absolute value of the sampled signal Ds is the certain value or less and the value of the phase information PH is within the certain range, the interpolation error Eint may be 1.

The decision/equalization circuit 204 illustrated in FIG. 2 may include a decision/feedback equalization circuit (DFE), for example, and equalizes the interpolated data signal Dint based on an equalization coefficient, which is set based on the interpolation error Eint, and checks the equalized interpolated data signal to output a decision signal Dd. When the interpolation error Eint is 0, the decision/equalization circuit 204 may not correct the interpolation error of the interpolated data signal Dint. Therefore, the decision/equalization circuit 204 performs equalization based on a standard equalization coefficient. When the interpolation error Eint is 1, the decision/equalization circuit 204 corrects the interpolation error of the interpolated data signal Dint, and therefore performs equalization based on an equalization coefficient for correction.

Figure 9:
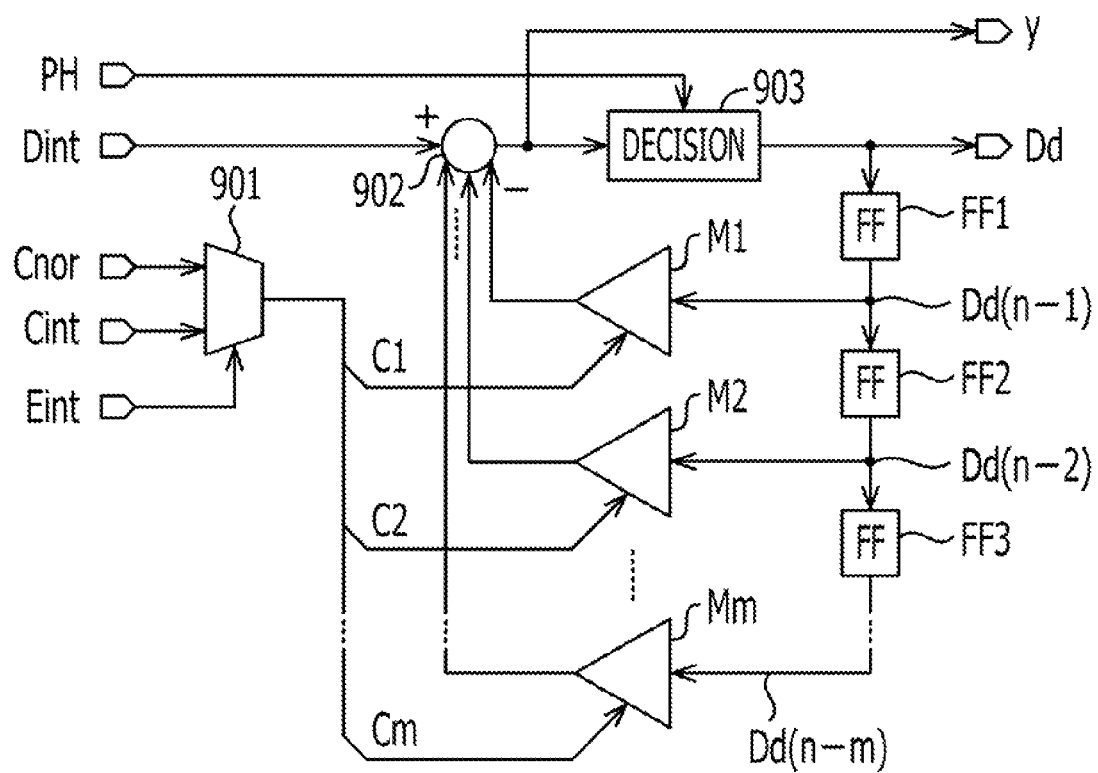
FIG. 9 illustrates an exemplary decision/equalization circuit.

FIG. 9 illustrates an exemplary decision/equalization circuit. The decision/equalization circuit illustrated in FIG. 9 may be a decision/feedback equalization circuit (DFE) with m taps. Equalization coefficients Cnor and Cint may correspond to a fixed equalization coefficient which is set in advance, and may be read from a memory or supplied from outside. The equalization coefficient Cnor may be a standard equalization coefficient. The equalization coefficient Cint may be an equalization coefficient for interpolation error correction. A selection circuit 901 selects the standard equalization coefficient Cnor when the interpolation error Eint is 0 and selects the equalization coefficient Cint for interpolation error correction when the interpolation error Eint is 1 to output equalization coefficients C1 to Cm. Each of the equalization coefficients Cnor and Cint may include m equalization coefficients C1 to Cm.

A subtractor 902 subtracts values output of multipliers M1 to Mm from the interpolated data signal Dint to output an equalized interpolated data signal y. A decision circuit 903 makes a binary decision on the equalized interpolated data signal y based on the phase information PH to output the decision signal Dd. For example, the decision circuit 903 may output the decision signal Dd at a high level (for example, +1 [V]) when the equalized interpolated data signal y is more than a threshold value (for example, 0 [V]), and may output the decision signal Dd at a low level (for example, −1 [V]) when the equalized interpolated data signal y is less than the threshold value (for example, 0 [V]).

The frequency of the input data signal Di illustrated in FIG. 3 may be substantially the same as or different from the frequency of the clock signal CK. When the frequencies are substantially the same as each other, four sampled signals Ds indicated by "○" marks are present in 2 UIs as illustrated in FIGS. 4A, 4B, 5A, and 5B. For example, one sampled signal Ds indicated by "○" mark is present in 0.5 UI. When the frequency of the clock signal CK is higher than the frequency of the sampled signal Ds, two sampled signal Ds indicated by "○" marks may be present in 0.5 UI. When the frequency of the clock signal CK is lower than the frequency of the sampled signal Ds, no sampled signal Ds indicated by "○" mark may be present in 0.5 UI.

Figure 10A:
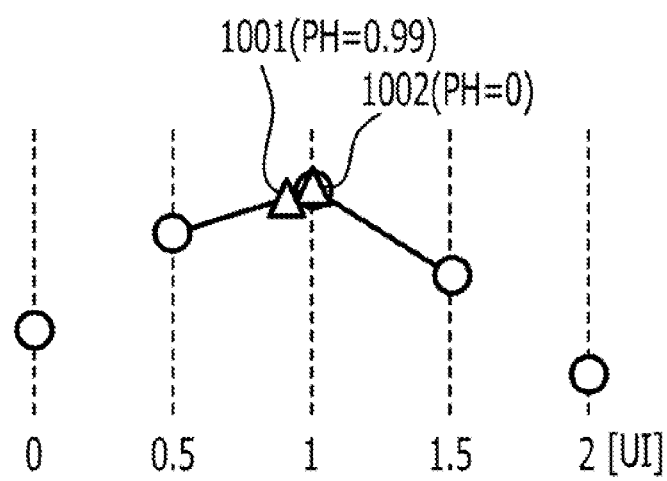
FIGS. 10A and 10B illustrate an exemplary interpolated data signal.
Figure 10B:
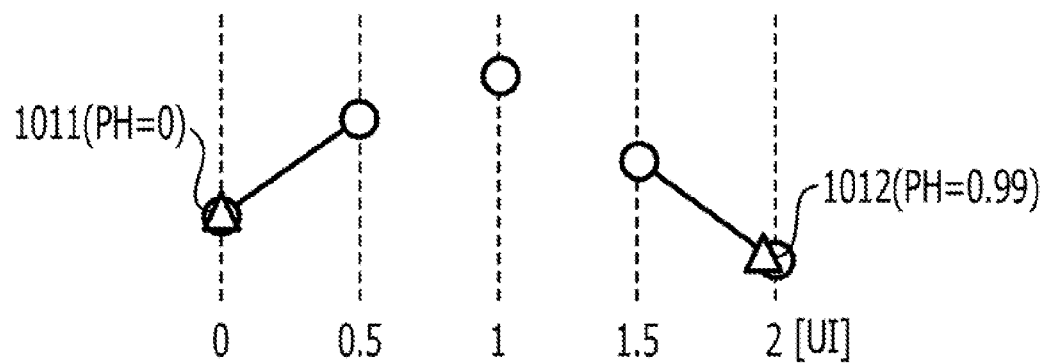

FIGS. 10A and 10B each illustrate an exemplary interpolated data signal. In FIG. 10A, the number of the interpolated data signal Dint may be excessive. A difference between the frequency of the clock signal CK and the frequency of the input data signal Di may increase the phase information PH. For example, the phase information PH may be shifted from 0.99 [UI] to 0 [UI]. The data interpolation circuit 202 generates data ("Δ" mark) 1001 for the interpolated data signal Dint based on the phase information PH at 0.99 [UI]. The data interpolation circuit 202 generates data ("Δ" mark) 1002 for the interpolated data signal Dint on the basis of the phase information PH at 0 [UI]. Two interpolated data 1001 and 1002 may be generated around 1 [UI] on the horizontal axis. The decision circuit 903 may determine that the phase information PH is excessive, and may select one of the interpolated data 1001 and 1002.

In FIG. 10B, the number of data of the interpolated data signal Dint may become short. The difference between the frequency of the clock signal CK and the frequency of the input data signal Di may decrease the phase information PH. For example, the phase information PH may be shifted from 0 [UI] to 0.99 [UI]. The data interpolation circuit 202 generates data ("Δ" mark) 1011 for the interpolated data signal Dint based on the phase information PH at 0 [UI]. The data interpolation circuit 202 generates data ("Δ" mark) 1012 for the interpolated data signal Dint based on the phase information PH at 0.99 [UI]. No interpolated data may be generated around the timing of 1 [UI] on the horizontal axis. The data interpolation circuit 202 generates as interpolated data the sampled signal Ds ("Δ" mark) at the phase of 1 [UI] on the horizontal axis. The decision circuit 903 may determine that the number of data in the phase information PH is short, and may decide the generated interpolated data at the phase of 1 [UI].

The decision/equalization circuit 204 with m taps illustrated in FIG. 9 includes m flip-flops FF1 to FFm and m multipliers M1 to Mm. The flip-flop FF1 delays an n-th decision signal Dd(n) output from the decision circuit 903 by one sample to output an n−1-th decision signal Dd(n−1). The flip-flop FF2 delays the n−1-th decision signal Dd(n−1) by one sample to output an n−2-th decision signal Dd(n−2). The flip-flop FF3 delays the n−2-th decision signal Dd(n−2) by one sample to output an n−3-th decision signal Dd(n−3). Likewise, the flip-flop FFm delays the n−m+1-th decision signal Dd(n−m+1) by one sample to output an n−m-th decision signal Dd(n−m).

The multiplier M1 multiplies the decision signal Dd(n−1) and the equalization coefficient C1 to output the resulting product. The multiplier M2 multiplies the decision signal Dd(n−2) and the equalization coefficient C2 to output the resulting product. Likewise, the multiplier Mm multiplies the decision signal Dd(n−m) and the equalization coefficient Cm to output the resulting product. The subtractor 902 subtracts the values output from the multipliers M1 to Mm from the interpolated data signal Dint to output the equalized interpolated data signal y as represented by the following formula. In the formula, y(n) is an n-th interpolated data signal.

$$y(n)=Dint(n)-C1 \times Dd(n-1)-C2 \times Dd(n-2)-\ldots-Cm \times Dd(n-m)$$

The decision/equalization circuit 204 includes an equalization circuit that equalizes the interpolated data signal Dint, the decision circuit 903 that decides the equalized interpolated data signal y, and the selection circuit 901 that selects the equalization coefficient Cnor or Cint based on the interpolation error Eint.

FIGS. 11A, 11B, 12A, 12B, 13A, and 13B each illustrate an exemplary waveform for the decision/equalization circuit. The "○" marks indicate the sampled signal Ds, the "Δ" marks indicate the interpolated data signal Dint, and the "□" marks indicate the interpolated data signal y after equalization. In order to simplify description, a 1-tap DFE may be used. The 1-tap DFE may equalize a waveform by adding the equalization coefficient to the current data when the data one sample earlier are −1 [V] and subtracting the equalization coefficient from the current data when the data one sample earlier are +1 [V].

Figure 11A:
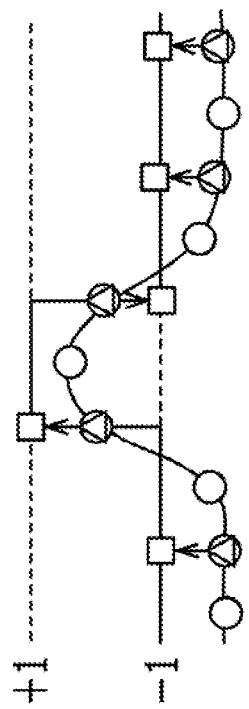
FIGS. 11A and 11B illustrate an exemplary waveform for the decision/equalization circuit.
Figure 11B:
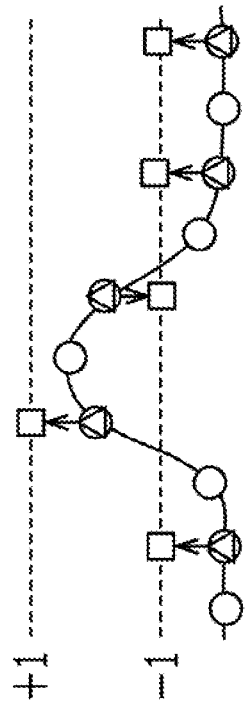

In FIGS. 11A and 11B, the decision/equalization circuit 204 may equalize the interpolated data signal Dint with no interpolation error based on the equalization coefficient Cnor. FIG. 11A illustrates a relationship between the interpolated data signal ("Δ" mark) Dint and the interpolated data signal ("□" mark) y after equalization. FIG. 11B illustrates a waveform of the interpolated data signal y after equalization. When there is no interpolation error, for example when the phase of the interpolated data signal ("Δ" mark) Dint and the phase of the sampled signal ("○" mark) Ds are substantially the same as each other, the waveform of the interpolated data signal ("□" mark) y after equalization may be recovered correctly.

Figure 12A:
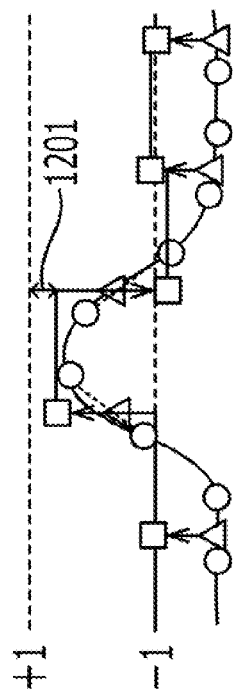
FIGS. 12A and 12B illustrate an exemplary waveform for the decision/equalization circuit.
Figure 12B:
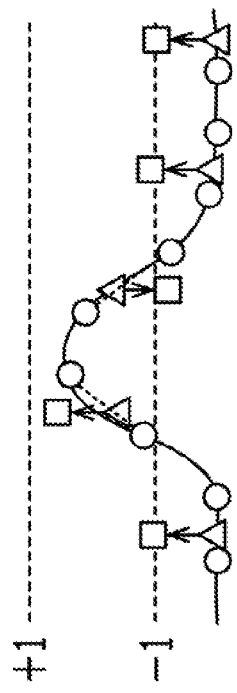

In FIGS. 12A and 12B, the decision/equalization circuit 204 may equalize the interpolated data signal Dint with no interpolation error based on the equalization coefficient Cnor. FIG. 12A illustrates a relationship between the interpolated data signal ("Δ" mark) Dint and the interpolated data signal ("□" mark) y after equalization. FIG. 12B illustrates a waveform of the interpolated data signal y after equalization. When there is an interpolation error, for example when the phase of the interpolated data signal ("Δ" mark) Dint and the phase of the sampled signal ("○" mark) Ds are different from each other, an error 1201 may occur in the waveform of the interpolated data signal ("□" mark) y after equalization, thereby degrading the reception performance. When the interpolation error Eint is 1, the equalization coefficient Cint for interpolation error correction may be used.

Figure 13B:
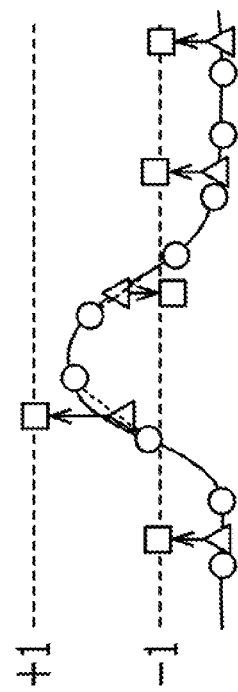
FIGS. 13A and 13B illustrate an exemplary waveform for the decision/equalization circuit.
Figure 13A:
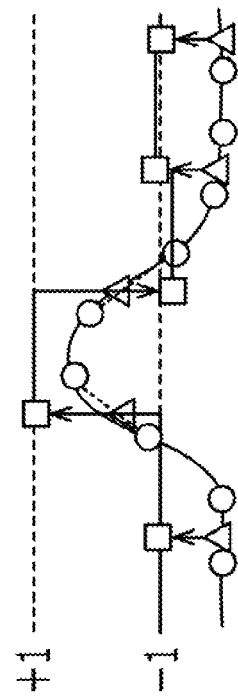

In FIGS. 13A and 13B, the decision/equalization circuit 204 may equalize the interpolated data signal Dint with an interpolation error based on the equalization coefficient Cint for interpolation error correction. FIG. 13A illustrates a relationship between the interpolated data signal ("Δ" mark) Dint and the interpolated data signal ("□" mark) y after equalization. FIG. 13B illustrates a waveform of the interpolated data signal y after equalization. When there is an interpolation error, for example when the phase of the interpolated data signal ("Δ" mark) Dint and the phase of the sampled signal ("○" mark) Ds are different from each other, the interpolation error Eint may become 1. Because the equalization coefficient Cint for interpolation error correction is set, an error in the interpolated data signal ("☐" mark) after equalization may be reduced, thereby reducing degradation in reception performance.

The phase detection circuit 205 illustrated in FIG. 2 generates phase information based on the decision signal Dd or the equalized interpolated data signal y to output the phase information PH to the data interpolation circuit 202 and the interpolation error decision circuit 203 via the filter 206. The phase detection circuit 205 detects the phases of data boundaries corresponding to the data transition points illustrated in FIGS. 5A and 5B, for example. For example, the phase detection circuit 205 interpolates a phase at which the decision signal Dd or the equalized interpolated data signal y becomes 0 [V]. The phase detection circuit 205 outputs the phase at the substantially middle between two adjacent data boundaries to the filter 206 as phase information at the middle of the data. Data transition in the input data signal Di may occur randomly. For example, the region 601 illustrated in FIGS. 5A and 5B may occur. The phase detection circuit 205 may detect the boundaries of the region 601 to detect average data boundaries. The average phase at the middle of the data may be output to the filter 206.

The filter 206 may be a low-pass filter, for example. The filter 206 low-pass filters a signal output from the phase detection circuit 205 to output the phase information PH to the data interpolation circuit 202 and the interpolation error decision circuit 203. The filter 206 removes high-frequency noise to output the averaged phase information PH. The filter 206 reduces abrupt variations in phase information PH, and may reduce variations in phase information PH.

The equalization, which is performed based on the equalization coefficient Cnor or Cint set in accordance with the interpolation error Eint, may reduce the interpolation error. The data interpolation circuit 202 may perform high-order interpolation to reduce the interpolation error. The data interpolation circuit 202 may perform linear interpolation to reduce the power consumption and the area. The interpolation error decision circuit 203 decides the magnitude of the interpolation error to output the interpolation error Eint. When the interpolation error is great, the amount of equalization performed by the decision/equalization circuit 204 is increased to correct the interpolation error. Since the decision/equalization circuit 204 corrects the interpolation error, an interpolation error correction circuit may not be provided besides the decision/equalization circuit 204. Therefore, a size (area) of hardware and an amount of computation may be reduced. The decision/equalization circuit 204 may assume the shape of the frequency characteristics of the transmission path to decide the direction of the interpolation error based on the pattern of the previous data Dd(n-1) to Dd(n-m) as illustrated in FIG. 9. This increases the amount of equalization to correct the interpolation error.

Figure 14:
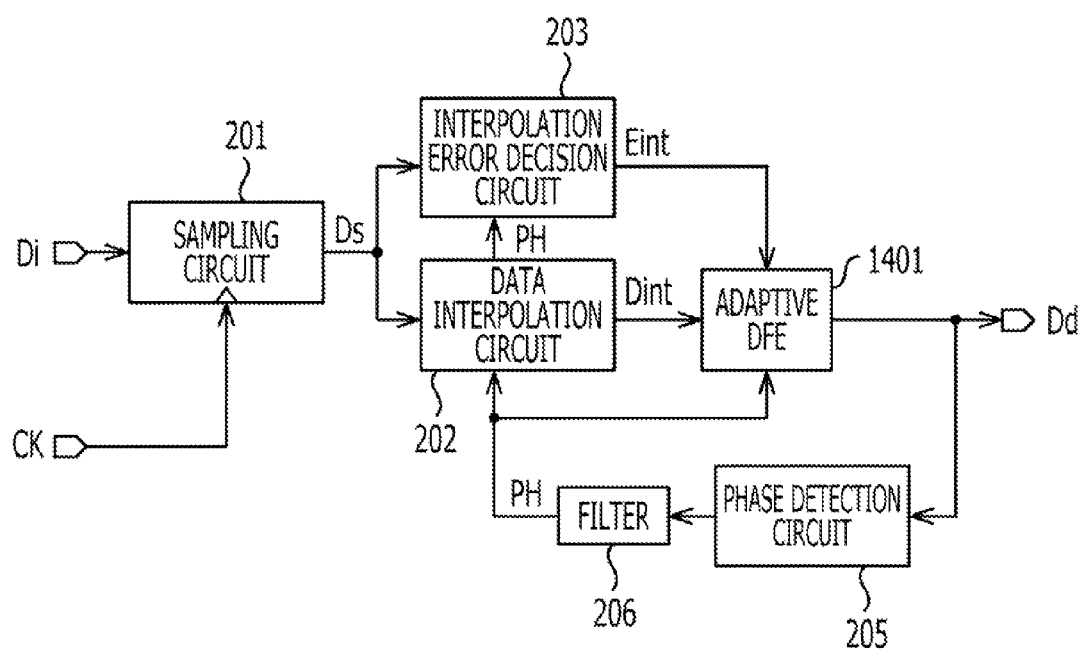
FIG. 14 illustrates an exemplary reception circuit.

FIG. 14 illustrates an exemplary reception circuit. The reception circuit illustrated in FIG. 14 may include a decision/equalization circuit 1401 in place of the decision/equalization circuit 204 illustrated in FIG. 2. The decision/equalization circuit 1401 may be an adaptive-control decision/feedback equalization circuit (adaptive-control DFE). Other elements illustrated in FIG. 14 may be substantially the same as or similar to the elements illustrated in FIG. 2.

Figure 15:
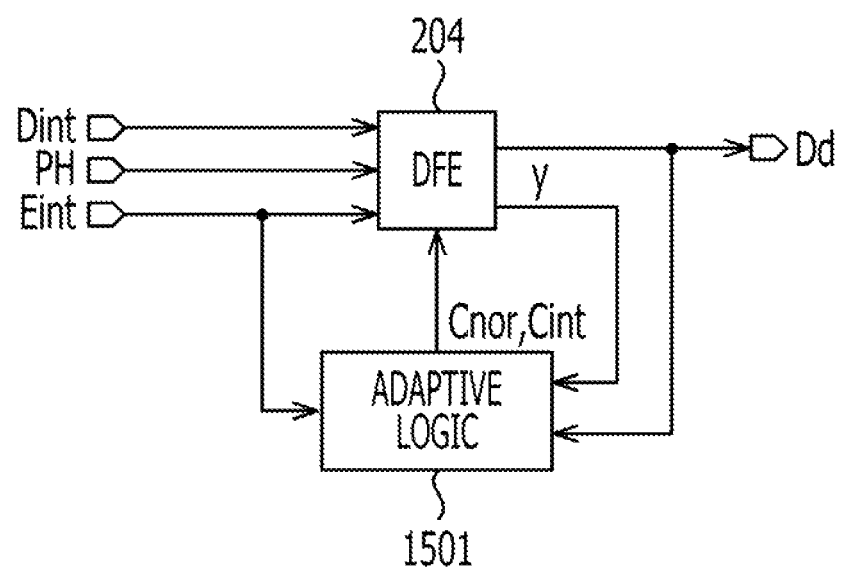
FIG. 15 illustrates an exemplary adaptive-control decision/feedback equalization circuit.

FIG. 15 illustrates an exemplary adaptive-control decision/feedback equalization circuit. The adaptive-control decision/feedback equalization circuit 1401 illustrated in FIG. 15 includes a decision/feedback equalization circuit 204 and an adaptive-control logic circuit 1501. The configuration of the decision/feedback equalization circuit 204 may be substantially the same as or similar to the configuration of the decision/feedback equalization circuit 204 illustrated in FIG. 2, for example. The configuration of the decision/feedback equalization circuit 204 may be substantially the same as or similar to the configuration of the circuit illustrated in FIG. 9, for example. The decision/feedback equalization circuit 204 receives the interpolated data signal Dint, the phase information PH, the interpolation error Eint, and the equalization coefficients Cnor and Cint as inputs to output the decision signal Dd and the interpolated data signal y after equalization. The adaptive-control logic circuit 1501 receives the interpolation error Eint, the decision signal Dd, and the interpolated data signal y after equalization to output the equalization coefficients Cnor and Cint to the decision/feedback equalization circuit 204. Since the adaptive-control logic circuit 1501 updates the equalization coefficients Cnor and Cint for the decision/feedback equalization circuit 204, a degradation in characteristics based on environmental changes, for example variations in transmission channel characteristics, manufacturing variations, fluctuations in power source voltage or temperature may be reduced.

Figure 16:
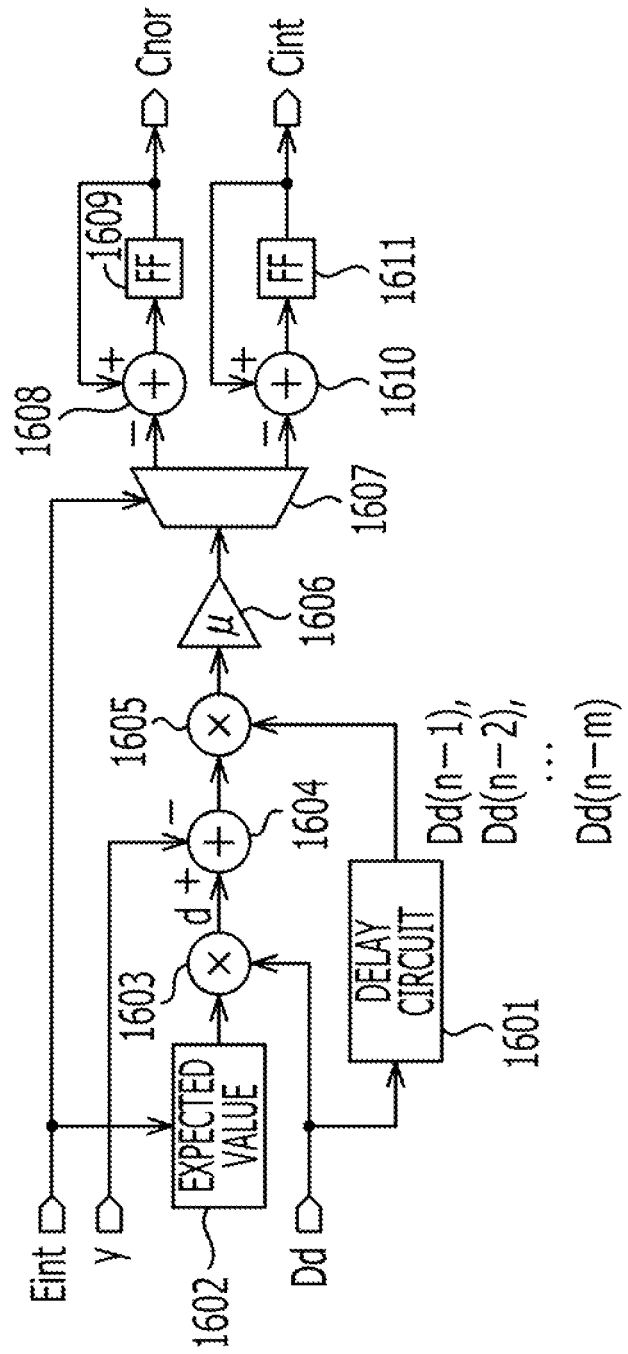
FIG. 16 illustrates an exemplary adaptive-control logic circuit.

FIG. 16 illustrates an exemplary adaptive-control logic circuit. The adaptive-control logic circuit 1501 receives the interpolation error Eint, the interpolated data signal y after equalization, and the decision signal Dd to output the equalization coefficients Cnor and Cint. Each of the equalization coefficients Cnor and Cint may include m equalization coefficients C1 to Cm illustrated in FIG. 9, for example. The adaptive-control logic circuit 1501 updates the equalization coefficients Cnor and Cint based on a least mean square (LMS) algorithm, for example. For example, the adaptive-control logic circuit 1501 may compute n+1-th equalization coefficients C1(n+1) to Cm(n+1) based on n-th equalization coefficients C1(n) to Cm(n), an update step width μ, an expected value d after equalization, an n-th interpolated data signal y(n) after equalization, and m previous decision signals Dd(n-1) to Dd(n-m) using the following formulas.

$$C1(n+1) = C1(n) - \mu \times (d - y(n)) \times Dd(n-1)$$

$$C2(n+1) = C2(n) - \mu \times (d - y(n)) \times Dd(n-2)$$

...

$$Cm(n+1) = Cm(n) - \mu \times (d - y(n)) \times Dd(n-m)$$

A delay circuit 1601 delays the decision signal Dd to output the m previous decision signals Dd(n-1) to Dd(n-m). An expected value circuit 1602 changes the expected value after equalization based on the interpolation error Eint. The expected value circuit 1602 outputs a first expected value when the interpolation error Eint is 0, and outputs a second expected value when the interpolation error Eint is 1. A multiplier 1603 multiplies the expected value output from the expected value circuit 1602 and the n-th decision signal Dd(n) to output the expected value d. A subtractor 1604 subtracts the n-th interpolated data signal y(n) after equalization from the expected value d to output a value d-y(n). A multiplier 1605 multiplies the m previous decision signals Dd(n-1) to Dd(n-m) by the value d-y(n) output from the subtractor 1604. A multiplier 1606 multiplies an output of the multiplier 1605 by the update step width. A selection circuit 1607 outputs an output of the multiplier 1606 to a subtractor 1608 when the interpolation error Eint is 0, and outputs the output of the multiplier 1606 to a subtractor 1610 when the interpolation error Eint is 1.

When the interpolation error Eint is 0, the subtractor 1608 subtracts the output of the multiplier 1606 from coefficients C1($n$) to Cm(n) of an n-th equalization coefficient Cnor output from a flip-flop 1609. The flip-flop 1609 stores an output of the subtractor 1608 and outputs an n+1-th equalization coefficient Cnor including equalization coefficients C1($n$+1) to Cm(n+1).

When the interpolation error Eint is 1, the subtractor 1610 subtracts the output of the multiplier 1606 from coefficients C1($n$) to Cm(n) of an n-th equalization coefficient Cint output from a flip-flop 1611. The flip-flop 1611 stores an output of the subtractor 1610 and outputs an n+1-th equalization coefficient Cint including equalization coefficients C1($n$+1) to Cm(n+1).

Since the adaptive-control logic circuit 1501 updates the equalization coefficients Cnor and Cint, a degradation in characteristics based on environmental changes, for example variations in transmission channel characteristics, manufacturing variations, fluctuations in power source voltage or temperature may be reduced.

Figure 17:
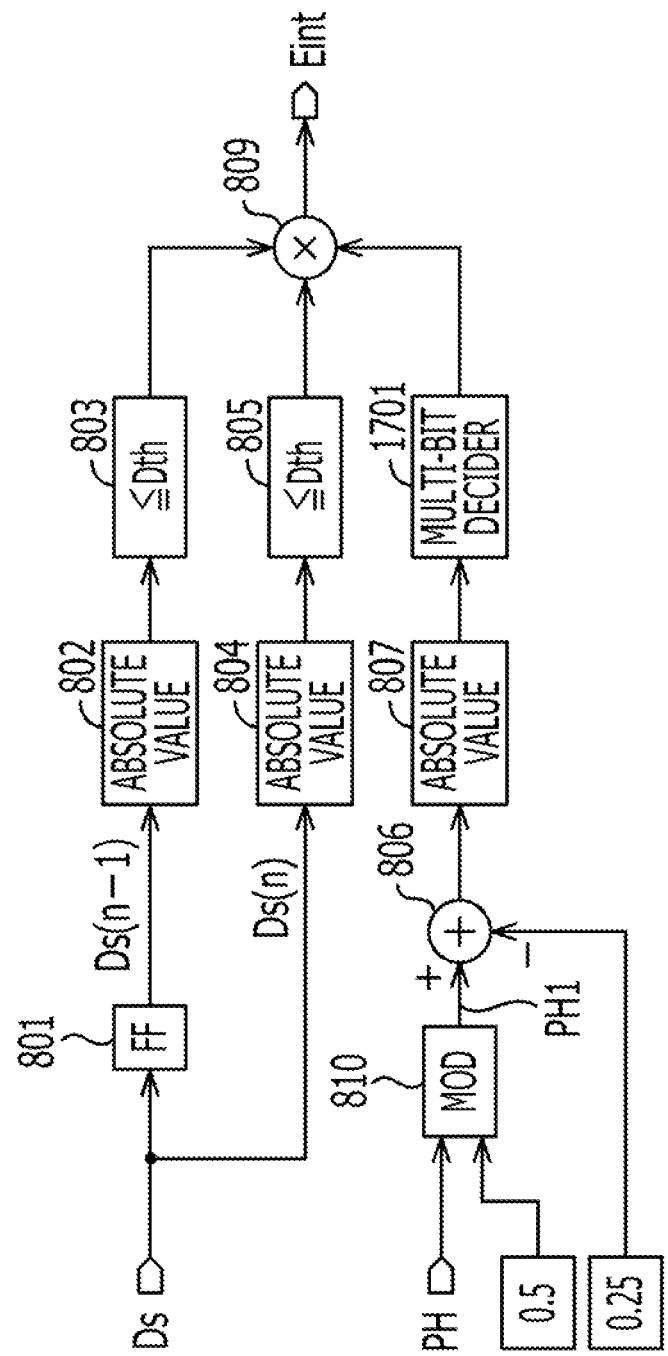
FIG. 17 illustrates an exemplary interpolation error decision circuit.

FIG. 17 illustrates an exemplary interpolation error decision circuit. An interpolation error decision circuit 203 (FIG. 14) as illustrated in FIG. 17 may include the interpolation error decision circuit 203 illustrated in FIG. 8 and a multi-bit decider 1701 corresponding to the comparator circuit 808 illustrated in FIG. 8. The multi-bit decider 1701 outputs a multi-bit digital value that may take three or more values in accordance with the output |PH1−0.25| of the absolute value circuit 807. The multiplier 809 multiplies outputs of the comparator circuits 803 and 805 and the multi-bit decider 1701 to generate the interpolation error Eint. The interpolation error Eint may be a multi-bit digital value that may take three or more values. The interpolation error may be greater as the digital value is greater.

Figure 18A:
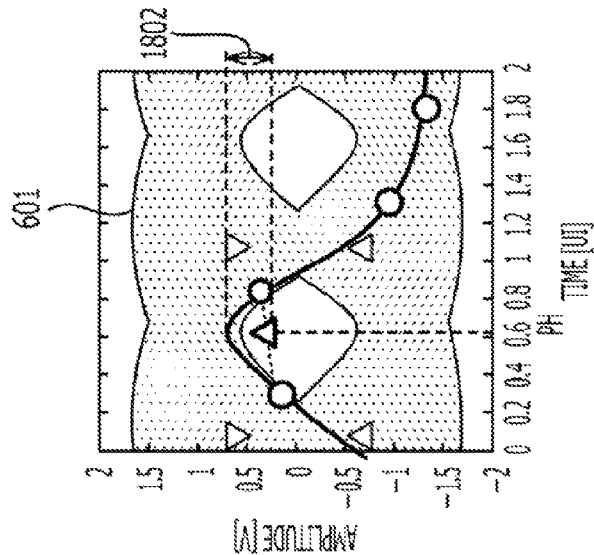
FIGS. 18A, 18B, and 18C illustrate an exemplary relationship between phase information and an interpolation error.
Figure 18B:
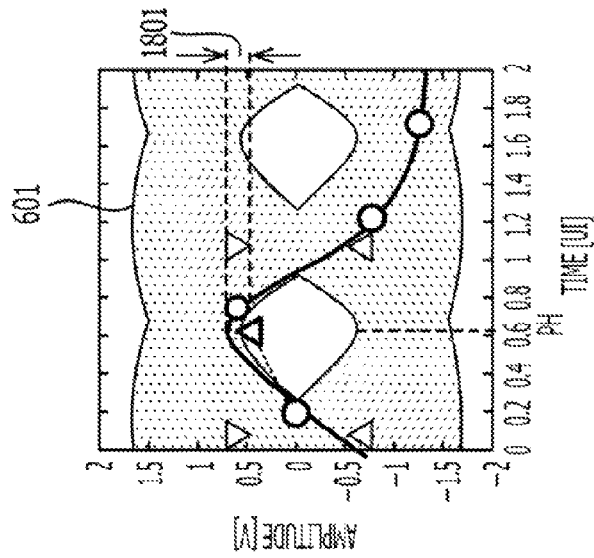
Figure 18C:
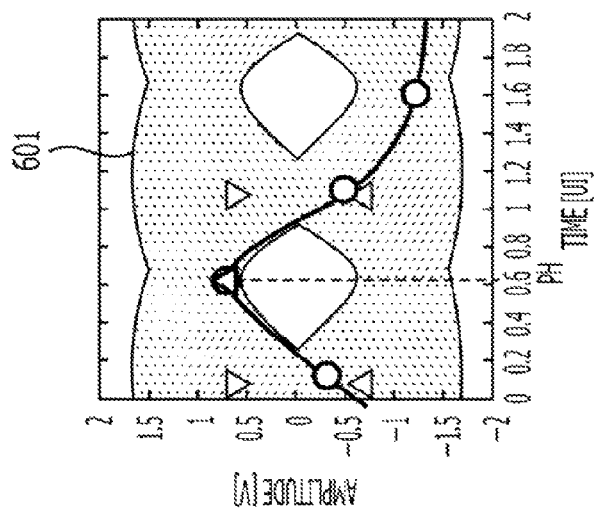

FIGS. 18A to 18C each illustrate an exemplary relationship between phase information and an interpolation error. In FIG. 18A, the difference between the phase of the interpolated data signal ("Δ" mark) Dint and the phase of the sampled signal ("○" mark) Ds may be 0. The phase of the interpolated data signal ("Δ" mark) Dint may correspond to the phase of the phase information PH. The phase information PH may be 0 or 0.5 [UI], and no interpolation error may be provided. For example, when the difference between the phase of the phase information PH and the phase of the sampled signal ("○" mark) Ds is small, the interpolation error may be small. The multi-bit decider 1701 may output a small decision value to the multiplier 809 when the output of the absolute value circuit 807 is small.

In FIG. 18B, the difference between the phase of the interpolated data signal ("Δ" mark) Dint and the phase of the sampled signal ("○" mark) Ds may be within a certain range. The phase of the interpolated data signal ("Δ" mark) Dint may correspond to the phase of the phase information PH. The phase information PH may be 0.4 or 0.9 [UI], and the magnitude of an interpolation error 1801 may be within a certain range. For example, when the difference between the phase of the phase information PH and the phase of the sampled signal ("○" mark) Ds is within a certain range, the interpolation error 1801 may be within the certain range. The multi-bit decider 1701 may output a decision value within a certain range to the multiplier 809 when the output of the absolute value circuit 807 is within a certain range.

In FIG. 18C, the difference between the phase of the interpolated data signal ("Δ" mark) Dint and the phase of the sampled signal ("○" mark) Ds may be great. The phase of the interpolated data signal ("Δ" mark) Dint may correspond to the phase of the phase information PH. The phase information PH may be 0.25 or 0.75 [UI], and the interpolation error 1802 may be great. For example, when the difference between the phase of the phase information PH and the phase of the sampled signal ("○" mark) Ds is great, the interpolation error 1802 may also be great. The multi-bit decider 1701 may output a great decision value to the multiplier 809 when the output of the absolute value circuit 807 is great.

The expected value circuit 1602 of FIG. 16 outputs different expected values after equalization in accordance with the interpolation error Eint. A number of combinations of subtractors and flip-flops, the number of which corresponds to the number of states of the interpolation error Eint, may be provided at the output of the selection circuit 1607. For example, when the interpolation error Eint takes three values, one combination of a subtractor and a flip-flop may be added to the output of the selection circuit 1607 so that three subtractors and three flip-flops are coupled in combination. The selection circuit 1607 selects one of three or more subtractors in accordance with the interpolation error Eint. Substantially the same number of equalization coefficients as the number of the states of the interpolation error Eint may be generated. The selection circuit 901 illustrated in FIG. 9 may also select one of three or more equalization coefficients in accordance with the interpolation error Eint to output the selected equalization coefficient to the multipliers M1 to Mm.

Since the interpolation error Eint which takes one of three or more values is checked based on the interpolation error, an appropriate equalization coefficient may be set with high accuracy in accordance with the interpolation error Eint. The accuracy in correcting the interpolation error may be improved.

All examples and conditional language recited herein are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A reception circuit comprising:
   a sampling circuit to sample an input data signal based on a clock signal and output a sampled signal;
   a data interpolation circuit to interpolate the sampled signal based on phase information corresponding to the sampled signal and output an interpolated data signal;
   an interpolation error decision circuit to output an interpolation error based on the sampled signal and the phase information;
   a decision/equalization circuit to equalize the interpolated data signal using an equalization coefficient set based on the interpolation error, to check the equalized interpolated data signal and to output a checked signal; and
   a phase detection circuit to generate the phase information based on at least one of the checked signal and the equalized interpolated data signal and output the phase information to the data interpolation circuit and the interpolation error decision circuit.

2. The reception circuit according to claim 1, wherein the interpolation error decision circuit outputs the interpolation error based on transition information and the phase information which correspond to the sampled signal.

3. The reception circuit according to claim 1,
wherein the interpolation error decision circuit includes:
a first comparator circuit to compare the sampled signal with a reference value;
a second comparator circuit to compare the phase information with a threshold value; and
a generation circuit to output the interpolation error based on an output of the first comparator circuit and an output of the second comparator circuit.

4. The reception circuit according to claim 1,
wherein the interpolation error decision circuit includes:
a comparator circuit to compare the sampled signal with a reference value;
a bit decider to output a multi-bit value in accordance with the phase information; and
a generation circuit to output the interpolation error based on an output of the comparator circuit and an output of the bit decider.

5. The reception circuit according to claim 1,
wherein the decision/equalization circuit includes:
an equalization circuit to equalize the interpolated data signal;
a decision circuit to check the equalized interpolated data signal; and
a selection circuit to select the equalization coefficient based on the interpolation error.

6. The reception circuit according to claim 1,
wherein the decision/equalization circuit includes an adaptive-control decision/feedback equalization circuit.

7. The reception circuit according to claim 6,
wherein the adaptive-control decision/feedback equalization circuit changes an expected value based on the interpolation error.

8. The reception circuit according to claim 1,
wherein the data interpolation circuit generates the interpolated data signal positioned substantially at a middle between boundaries of the input data signal based on the phase information.

9. The reception circuit according to claim 1,
wherein the data interpolation circuit generates the interpolated data signal through linear interpolation.

10. The reception circuit according to claim 1, further comprising:
a filter to filter a signal output from the phase detection circuit.

* * * * *